US008797872B1

(12) United States Patent
Lambi

(10) Patent No.: US 8,797,872 B1
(45) Date of Patent: Aug. 5, 2014

(54) METHOD AND APPARATUS FOR REDUCING SWITCHOVER LATENCY IN IPTV SYSTEMS

(75) Inventor: Ravindra M. Lambi, Old Bridge, NJ (US)

(73) Assignee: Ikanos Communications Inc., Fremont, CA (US)

( * ) Notice: Subject to any disclaimer, the term of this patent is extended or adjusted under 35 U.S.C. 154(b) by 377 days.

(21) Appl. No.: 12/924,764

(22) Filed: Oct. 4, 2010

Related U.S. Application Data

(60) Provisional application No. 61/248,413, filed on Oct. 2, 2009.

(51) Int. Cl.
*H04L 12/54* (2013.01)
*H04N 21/231* (2011.01)
*H04L 12/56* (2006.01)
*G06F 7/10* (2006.01)
*H04L 29/08* (2006.01)

(52) U.S. Cl.
CPC ...... *H04N 21/23113* (2013.01); *H04L 49/9005* (2013.01); *H04L 49/9047* (2013.01); *H04L 29/08801* (2013.01); *H04L 29/08819* (2013.01)
USPC ........................................ 370/235; 370/230.1

(58) Field of Classification Search
CPC ............................................... H04L 29/08801
USPC ......... 370/216–228, 410, 412–413, 485–487, 370/231–235, 390; 725/86–142
See application file for complete search history.

(56) References Cited

U.S. PATENT DOCUMENTS

| 8,161,519 B2 * | 4/2012 | Krause et al. .................. 725/138 |
| 8,335,956 B2 * | 12/2012 | Tzannes ......................... 714/748 |
| 2005/0190794 A1 * | 9/2005 | Krause et al. .................. 370/485 |
| 2008/0209499 A1 * | 8/2008 | Ramesh et al. ................. 725/138 |
| 2008/0212589 A1 * | 9/2008 | Yang ........................... 370/395.1 |
| 2008/0282299 A1 * | 11/2008 | Koat et al. ....................... 725/93 |
| 2009/0201988 A1 * | 8/2009 | Gazier et al. .............. 375/240.06 |
| 2010/0235432 A1 * | 9/2010 | Trojer .......................... 709/203 |

* cited by examiner

*Primary Examiner* — Hanh N Nguyen
*Assistant Examiner* — Joshua A Kading
(74) *Attorney, Agent, or Firm* — Pillsbury Winthrop Shaw Pittman LLP

(57) ABSTRACT

A distribution node among a network of distribution nodes for packet based distribution of voice, video and data packets including multicast packet based distribution of video channels from at least one video server distribution node to a plurality of client distribution nodes selectively consuming the video channels is disclosed. The distribution node comprises a responsive to selection of a new video channel to identify a sub-set of packets within a set of packets of the new video channel for expedited delivery and to expedite delivery of the identified sub-set of packets; thereby reducing switchover latency of the distribution node in response to a selection of the video channel.

22 Claims, 7 Drawing Sheets

Digital Video Encoding

METHOD AND APPARATUS FOR REDUCING SWITCHOVER LATENCY IN IPTV SYSTEMS

CROSS REFERENCE TO RELATED APPLICATION

This application claims the benefit of prior filed Provisional Application No. 61/248,413 filed on Oct. 2, 2009 entitled "Method and Apparatus for Reducing Switchover Latency in IPTV Systems" which is incorporated herein by reference in its entirety as if fully set forth herein.

BACKGROUND OF THE INVENTION

1. Field of Invention

The field of the present invention relates to packet switched distribution of video and television over networks.

2. Description of the Related Art

The distinction between content available on TVs and computers used to be reasonably clear. TVs delivered selectable television channels or video on demand from established content providers on large dedicated displays with integrated tuning. Computers delivered the Internet with static pages and short video clips on relatively small displays. A loosely organized suite of protocols differing by region and provider and identified as Internet Protocol TV (IPTV) is gradually blurring this distinction. IPTV delivers traditional selectable live TV and stored VOD content from traditional content providers in a packet switched format over the Internet to computers or TVs. In the United States AT&T offers such IPTV services under their U-Verse brand. To reduce network traffic, the video content is heavily compressed using various Motion Picture Experts Group (MPEG) codecs the most recent of which is H.264 (MPEG-4). The compressed video is parsed into packets and encapsulated for transport over the Internet. To reduce bandwidth associated with routing the same packets to multiple computers or TV's viewing the same content from a single head end multicast protocols such as Internet Group Management Protocol (IGMP) and Protocol Independent Multicast (PIM) have been promulgated. These protocols allow intelligent feedback between and operation of distribution nodes across the network, e.g. video head end, router, switches, bridges, broadband access devices and set top boxes. Each compliant distribution node reduces redundancy in upstream packets to viewers in the same group and is capable of replicating packets to downstream viewers of the same content.

Current IPTV systems require a significant investment in delivery infrastructure, and the first entrants into the market appear to be Telco's seeking to expand the number of customer services available over a single broadband connection, e.g. a subscriber line. For marketing purposes such services are identified as 'triple play' if they include: wired telephone, TV, and high speed Internet or 'quadruple play' if they also offer wireless mobile phone access within the home.

The chief concerns among prospective customers of these Telco offerings as regards the TV or VOD portion of the offering are picture quality and latency. Latency corresponds to the time delay between the selection of a new channel, i.e. TV or VOD, and the viewing of that selection in the home or residence.

What is needed is an IPTV system with improved picture quality and reduced latency.

SUMMARY OF THE INVENTION

The present invention provides a method and apparatus for reducing switchover latency in video delivery systems. In an embodiment of the invention video comprises at least one of: a TV channel, an IPTV channel and a Video on Demand (VOD). The invention may be implemented on networked distribution nodes including: a video head end, a router, a switch, a bridge, a gateway, a set top box, and broadband access devices. Broadband access devices include various types and combinations of transceivers interfacing with wired, wireless and optical communication mediums. Examples of broadband access devices (BAD) include: a DSL modem, a cable modem, wireless access points, cell phones, an optical transceiver and a microwave transceiver.

In an embodiment of the invention a distribution node among a network of distribution nodes for packet based distribution of voice, video and data packets including multicast packet based distribution of video channels from at least one video server distribution node to a plurality of client distribution nodes selectively consuming the video channels is disclosed. The distribution node comprises a video sub-channel manager. The video sub-channel manager is responsive to selection of a new video channel to identify a sub-set of packets within a set of packets of the new video channel for expedited delivery and to expedite delivery of the identified sub-set of packets; thereby reducing switchover latency of the distribution node in response to a selection of the video channel.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
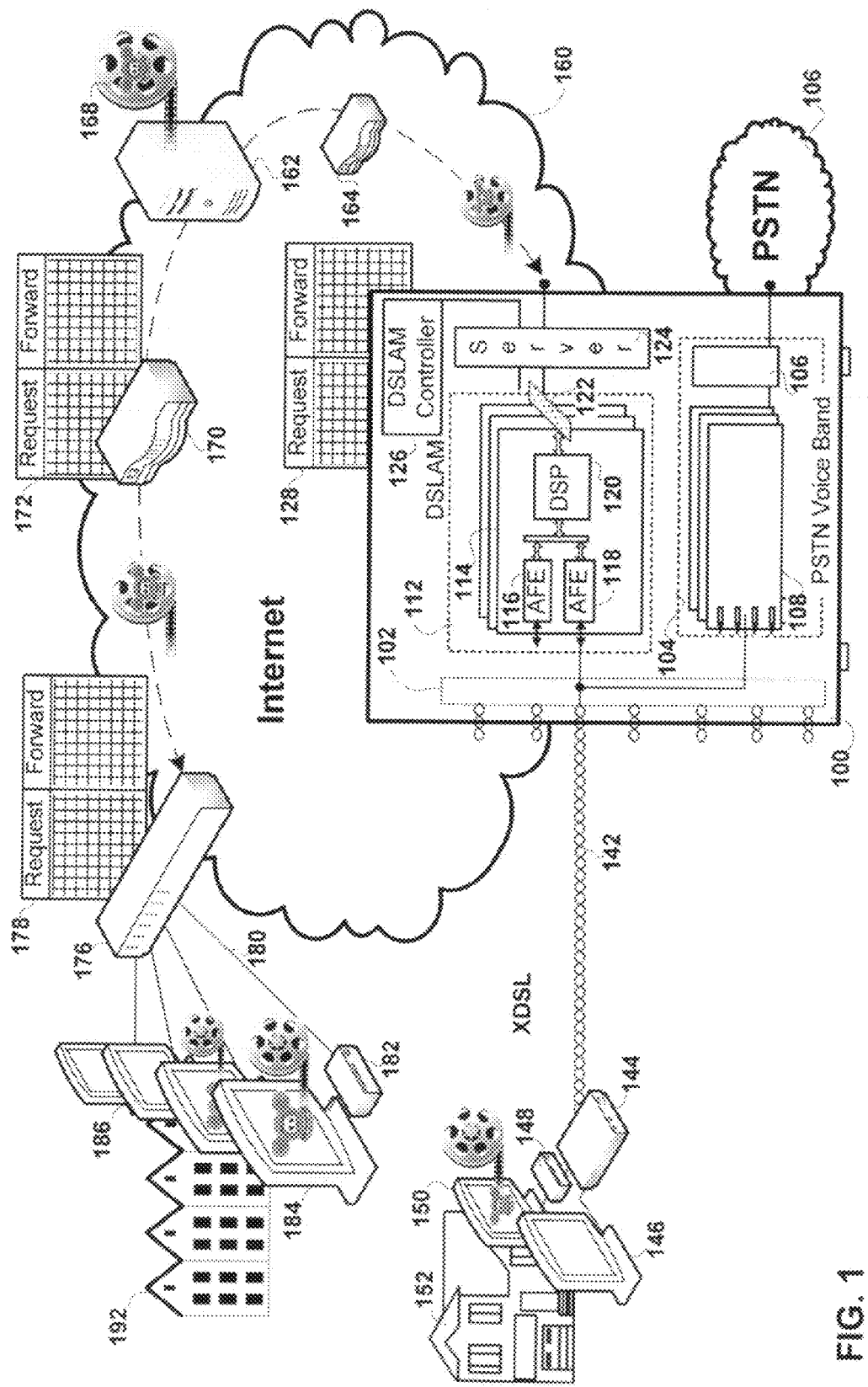
FIG. 1 is a network diagram showing an embodiment of a communication system with a video distribution server delivering multicast video via intermediate distribution nodes to multiple clients.

FIG. 1 is a network diagram showing an embodiment of a communication system with a video distribution server 162 delivering multicast video 168 via intermediate distribution nodes to multiple hosts/clients/subscribers/viewers in home 152 or offices 192. In the embodiment shown the head end video server 162 distributes one or more selectable videos 168 over the Internet 160 to residence 152 via a Telco central office (CO) 100 and subscriber line 142. Additional service is provided from the same server over the Internet to business 192 via gateway/switch 176 and optical links 180.

The phrase 'video' is used expansively to include any multimedia content, e.g. TV or video, offered in any business model, e.g. subscription, pay per view, advertising supported or corporate/educational training etc. The media over which the packet switched distribution is accomplished shall be understood to include any and all communication media supporting delivery of packet switched video, e.g. terrestrial, satellite, wired, optical or wireless.

Representative distribution nodes from source to destinations include: a video/TV head end server 162, routers 164, 170, digital subscriber line access module (DSLAM) 112, gateway/switch 176, broadband access device 144 and set top boxes 148, 182 and analog/digital TVs 146, 150, 184, 186. Any one or all of the above referenced distribution nodes can be configured to implement various embodiments of the current invention.

All subscriber lines handled by the CO originate in the splitter 102 of the CO. From this room connections are made for each subscriber line via splitters and hybrids to both a digital subscriber line access module (DSLAM) 112 and to the voice band racks 104. The splitter 102 shunts voice band communications to dedicated line cards, e.g. line card 108, or to a voice band modem pool (not shown). The splitter shunts higher frequency XDSL communications on the subscriber line to a selected line card, e.g. line card 114, within DSLAM 112. Voice band call set up is controlled by a Telco switch matrix 106 such as SS7. This makes point-to-point connections to other subscribers for voice band communications across the public switched telephone network (PSTN) 106.

The DSLAM module 112 includes a plurality of logical XDSL modems on multi-port line cards, e.g. line card 114, for handling XDSL communications. Each line card includes a digital signal processor (DSP) coupled to a plurality of analog front ends (AFE). The DSP 120 couples across a bus with a number of AFEs 116, 118. Each AFE couples with a corresponding one of the subscriber lines. The line card 114 is coupled via the back-plane bus 140 to a network, e.g. the Internet 160, via server 124. Each of the DSLAM line cards operates under the control of a DSLAM controller 126 which handles global provisioning, e.g. allocation of subscriber lines to AFE and DSP resources. The various components on the line card form a plurality of logical modems each handling frequency division multiple access (FDMA) upstream (from remote to CO) and downstream (from CO to remote) communications across corresponding subscriber lines.

A communication from one source to many hosts is said to be "multicast". To conserve network resources required for video distribution a number of multicast protocols have been advanced, among which, Internet Group Management Protocol (IGMP) and Protocol Independent Multicast (PIM) are currently the most widely implemented. These protocols allow intelligent feedback between and operation of distribution nodes across the network, e.g. video head end, router, switches, bridges, broadband access devices and set top boxes. Each compliant distribution node reduces redundancy in upstream packets to viewers in the same group and is capable of replicating packets to downstream viewers of the same content. The communications as to video source and destination are kept in one or more tables or trees or group membership listings 172, 178, 128 on compliant distribution nodes 176, 170 and 112 respectively. The IGMP protocol is used to establish host memberships in multicast groups, via join and leave requests. Hosts register with a router to join or leave specific multicast groups. The PIM protocol is used by routers to determine the forwarding of multicast packets and is integrable with existing routing tables. The specific data structure implemented in the PIM protocol is referred to as a source or shared tree depending on whether the root of the tree is the video source or a rendezvous point other than the source.

Figure 2A:
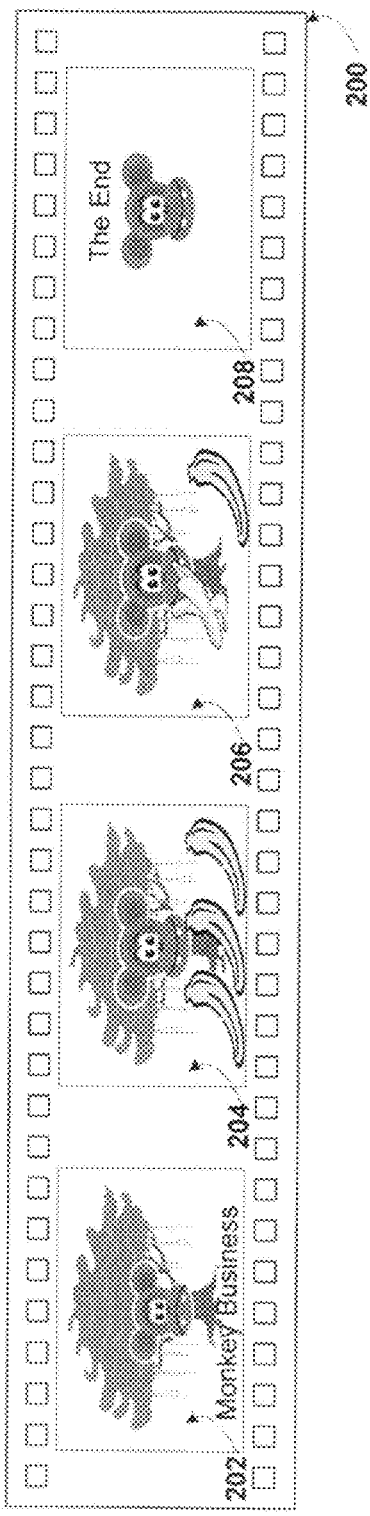
FIGS. 2A, 2B are graphical representations of a representative compression method for distribution of TV or Video over a network.
Figure 2B:
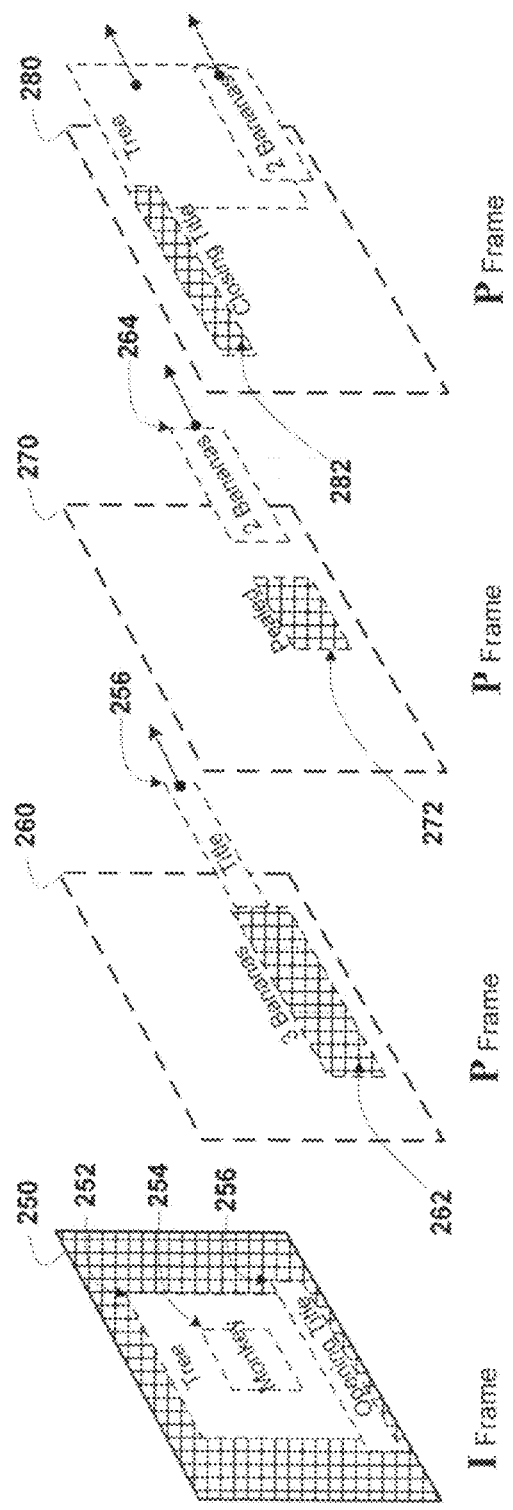

FIGS. 2A, 2B are graphical representations of a representative compression method for distribution of TV or Video over a network. FIG. 2A shows a legacy transparent celluloid projection type video 200 split into successive sequential frames 202, 204, 206 208. FIG. 2B shows graphically a contemporary compressed digital representation of the same movie. The particular compression format is identified as Motion Picture Experts Group (MPEG) of which the current version is identified as H.264 or MPEG 4. MPEG compression has from its inception been based on two basic insights: a) that the rasterized lines of pixels in a video frame can be represented as by a compact function, e.g. a Fourier series or wavelet, and b) that large portions of any given picture remain constant between frames. Successive versions of MPEG exploit these insights to digitally compress videos at increasingly higher compression ratios.

FIG. 2B shows abstract concepts associated with MPEG encoded digital video. MPEG-2 has three frame types: I, P and B which in successive combinations are used to encode a video. Of the 3 frame types only one is faithfully compresses a corresponding video frame in its entirety. The remaining P and B frame compression types quantify changes between successive frames rather than the entire contents of their raw counterparts. The Predictive coded or "P" frame quantify differences with respect to the preceding frame. The bidirectionally-predictive-coded or "B" frames quantify differences in the subject frame with respect to both preceding and succeeding frames. Video MPEG encoding results in a stream of successive I-Frames between which P and B frames are interlaced. Digitally all frames are displayed as pixels, but in compressed form blocks of pixels, identified as macro blocks, from the raw video frame source are each expressed mathematically as a Fourier series, otherwise known as a cosine function. The I frame 250 contains all the compressed macro block counterparts of the corresponding raw frame 202, as represented by the cross-hatch pattern background in I frame 250. The immediately succeeding frames 260, 270, 280 in the example shown are all P frames. The only macro blocks these frames contain are those corresponding to sub-portions of the preceding I frame which have moved or been removed. Motion in a macro block is encoded as an offset encoded as a "motion vector".

In the example shown for P Frame 260, the macro block(s) 256 associated with the original title "Monkey Business" are shown moving off the frame and new macro blocks 262 associated with the 3 bananas shown in raw frame 204 are shown moving into the P-frame to a location indicated by the corresponding motion vector.

In the example shown for P Frame 270, the macro block(s) 264 associated with two of the bananas are shown moving off the frame and new macro blocks 272 associated with the pealed banana shown in raw frame 206 are shown moving into the P-frame to a location indicated by the corresponding motion vector.

In the example shown for P Frame 280, the macro block(s) associated with the tree and bananas are shown moving off the frame and new macro blocks 282 associated with the closing title "The End" shown in raw frame 208 are shown moving into the P-frame to a location indicated by the corresponding motion vector.

Subsequent MPEG versions, e.g. MPEG 4, in addition to defining additional frame types also extend the concept of the I, P, B frame types to the sub-frame level where they are referred to as "Slices" which collectively make up a frame.

Figure 3:
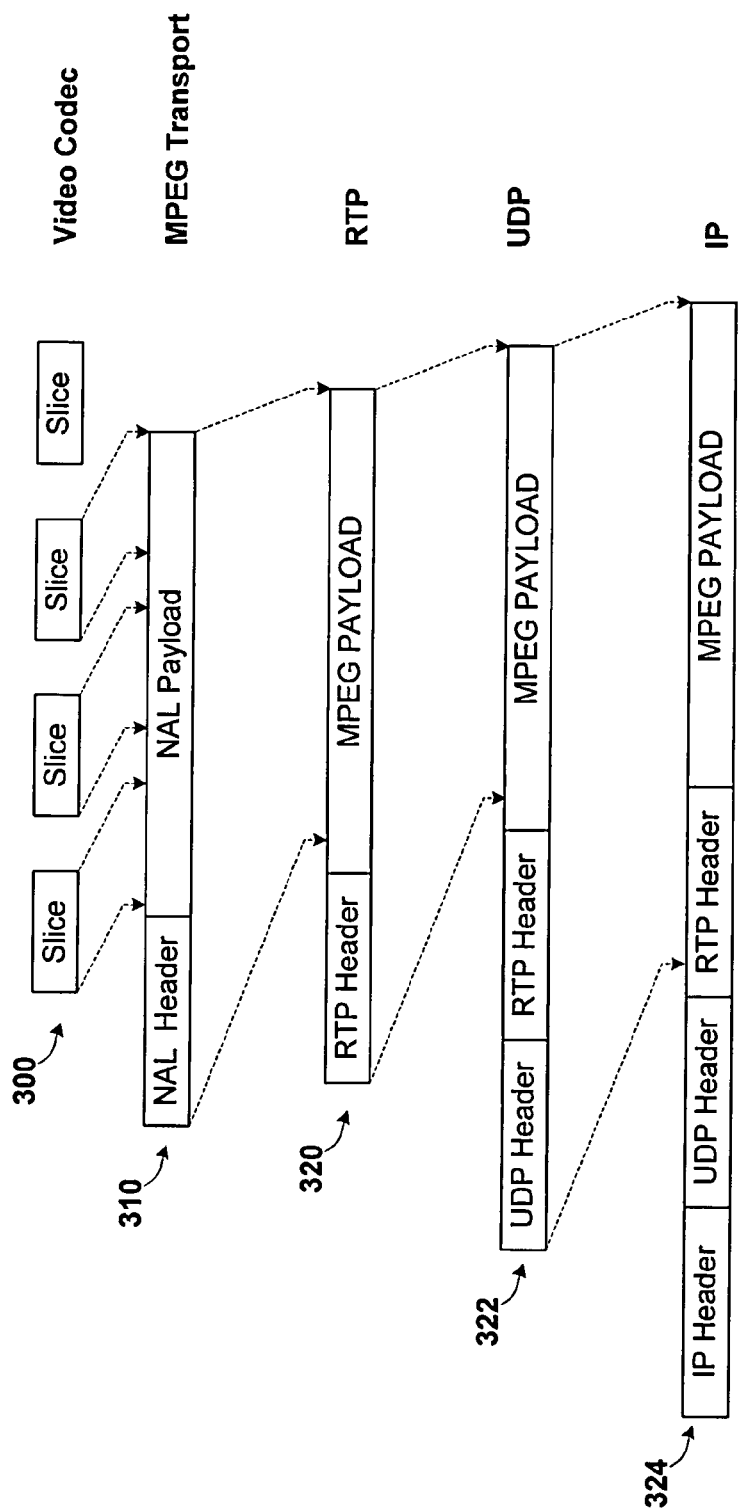
FIG. 3 is a data structure diagram showing various representative encapsulations associated with packetizing video for transport over a network.

FIG. 3 is a data structure diagram showing various representative encapsulations for transport of IPTV one or all of which may be used to packetize video for transport over a network. The slices 300 of a video codec, e.g. MPEG 4, are encapsulated in the payload portion of an MPEG transport packet identified as a Network Access Layer (NAL) packet 310 which includes a corresponding NAL header. The resultant NAL packet is encapsulated in the payload portion of a Real-Time Transport Protocol (RTP) packet 320 which includes a corresponding RTP header. The resultant RTP packet is encapsulated in the payload portion of a User Datagram Protocol (UDP) packet 322 which includes a corresponding UDP header. The resultant UDP packet is encapsulated in the payload portion of an Internet Protocol (IP) packet 324 which includes a corresponding IP header.

Figure 4:
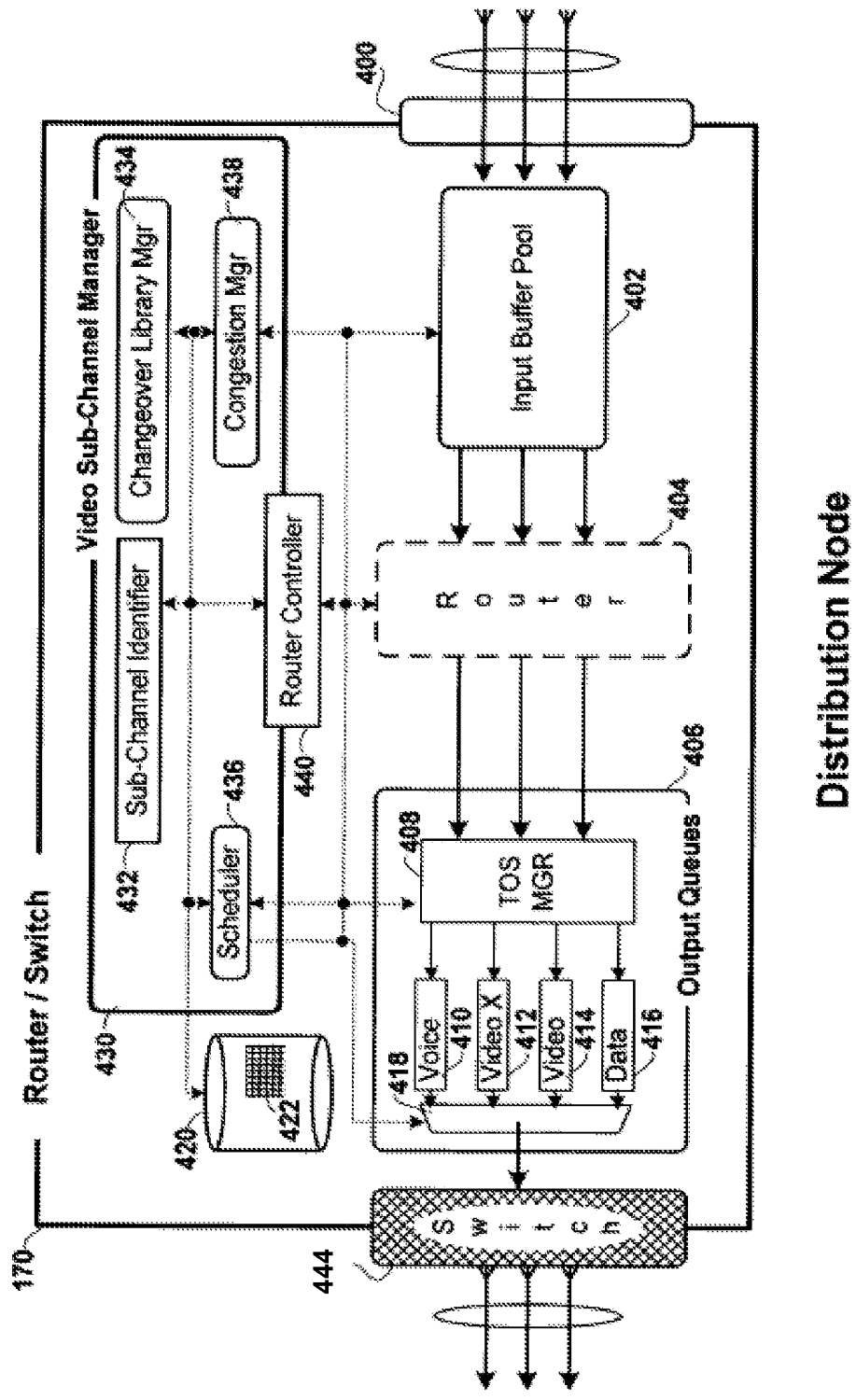
FIGS. 4, 5, 6 are hardware block diagrams of alternate embodiments of the distribution nodes in router, broadband access device and set top box configurations respectively.
Figure 5:
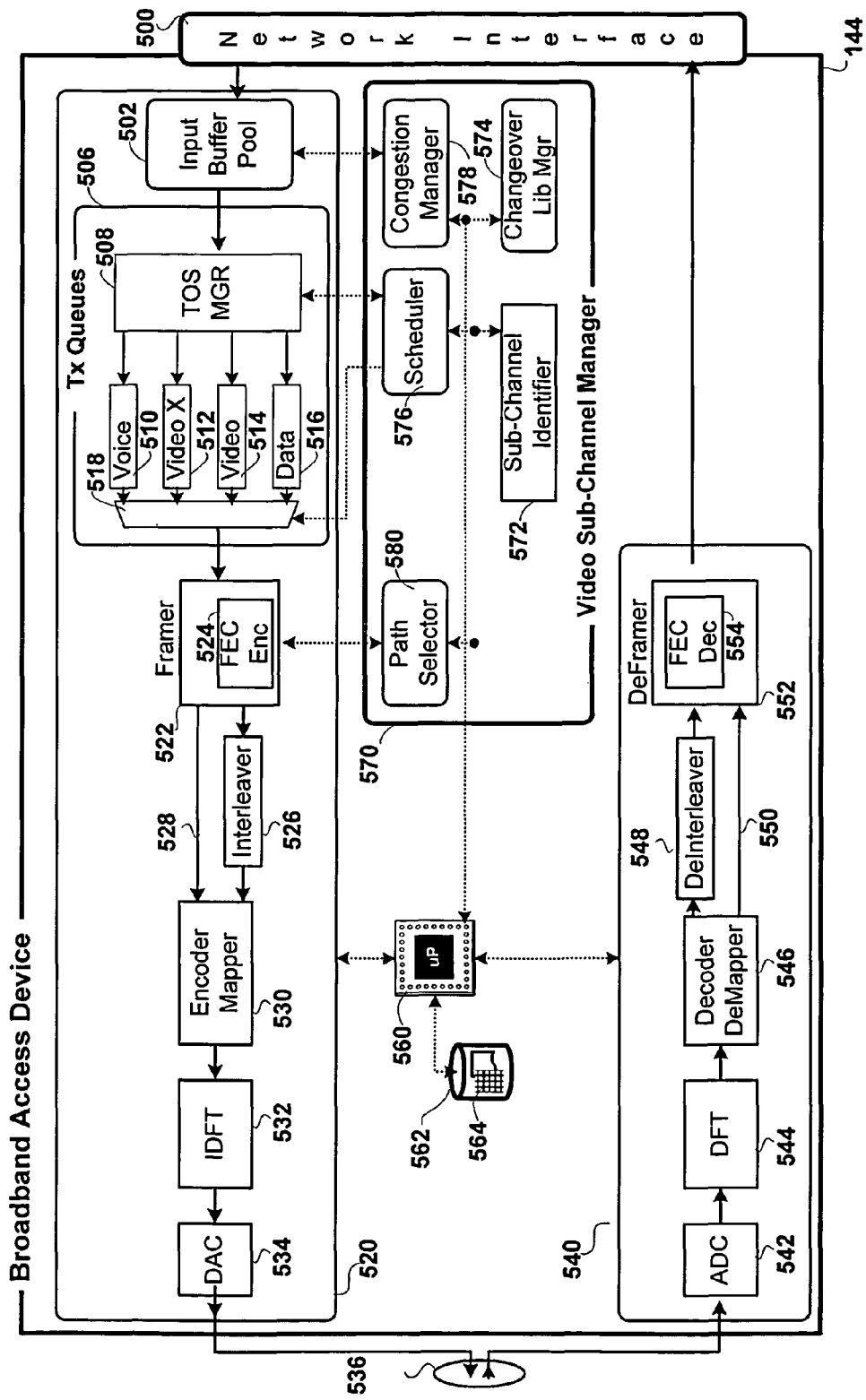
Figure 6:
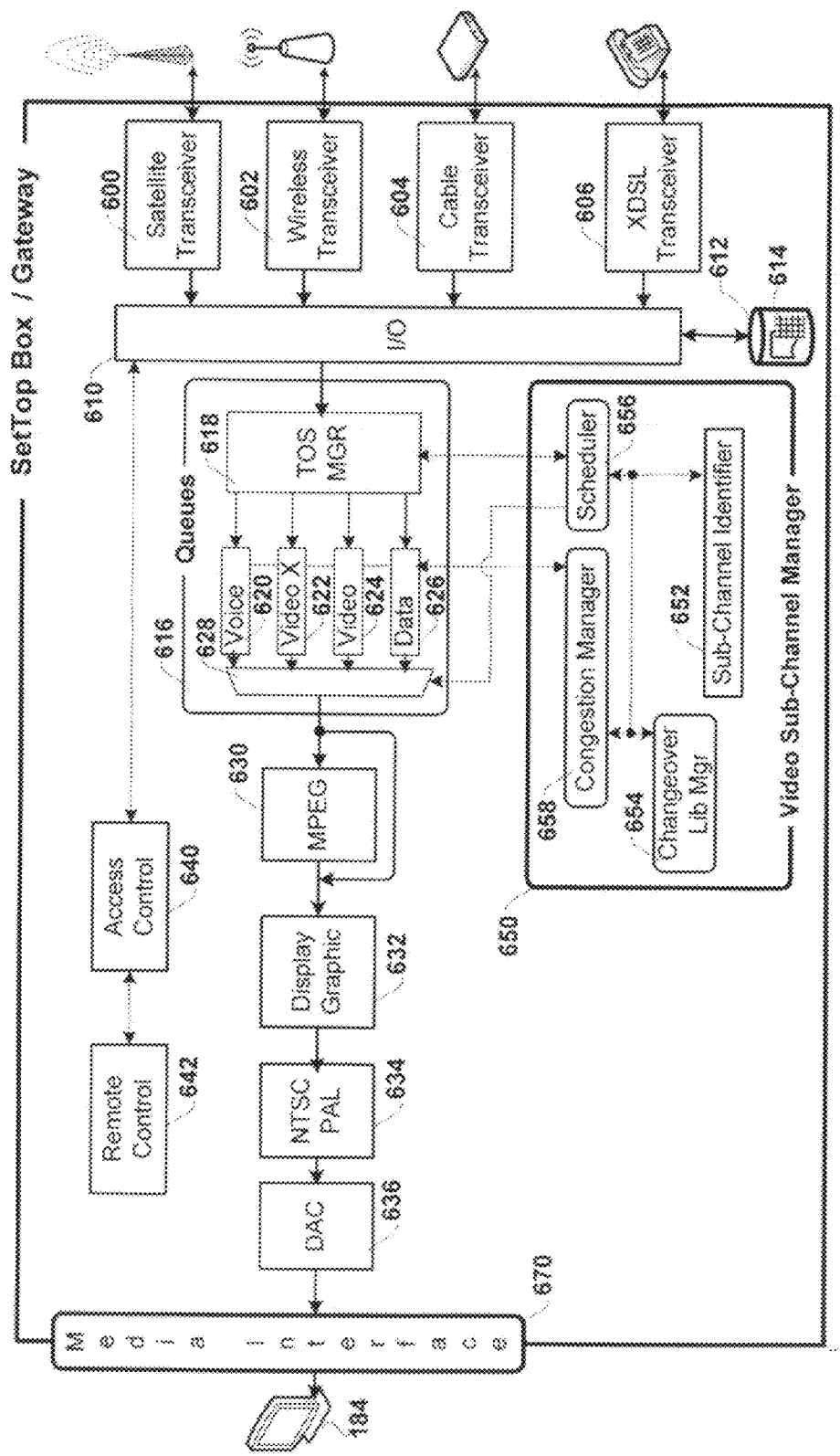

FIGS. 4, 5, 6 are hardware block diagrams of alternate embodiments of the distribution nodes in router, broadband access device, and set top box configurations respectively.

FIG. 4 is a hardware block diagram of the router/switch 170 of FIG. 1. The router includes: a router controller 440, a multiport input 400, input buffer pool 402, router 404 and output queues 406 coupled to multi-port output switch 444. In operation received packets are buffered in the buffer pool. In the router the buffered packets have their destination headers updated to correspond with the network address of the next node along the optimal path across the network as determined by the router using information available in the routing tables 422 stored in memory 420. The outgoing packets from the router are placed in a corresponding one of prioritized output queues, as determined by the terms of service (TOS) manager 408. The queues include: voice 410, video 414, and data 416 output queues for delivery via scheduling multiplexer 418 to switch 444.

The video sub-channel manager (VSM) 430 in this embodiment of the invention couples to the various router components to reduce the latency associated with delivering a newly selected video channel and the packets associated therewith to a host/client/subscriber which has requested the channel. A video channel may comprise a selected TV channel or a selected on demand video for example.

The sub-channel identification module 432 of the VSM identifies a subset of the received packets associated with the new video channel for expedited processing. In an embodiment of the invention the subset of packets consists exclusively of packets containing I frame(s). In another embodiment of the invention the identified subset of packets consists of both I and other frames from the initial frames of the new channel. After such identification the identified subset of packets are subject to expedited processing.

The changeover library manager module 434 in an embodiment of the invention, stores prior identified subsets of packets from prior selected video channels and retrieves the one corresponding with a newly selected channel. The changeover library manager then elevates the delivery priority of the subset located in storage by placing it in the expedited video output queue 412 as opposed to video queue 414 which has a relatively lower priority. This assures that the associated 'preview thumbnail' of the newly selected video channel will have the highest delivery priority to the requesting host/client/subscriber and can be used to display a preview the newly selected channel on the host TV or computer display significantly in advance of the arrival of the remaining packets of the video channel.

The congestion manager module 438 may also expedite processing of an identified subset of packets of a newly selected video channel by avoiding discard of such packets in the event of congestion in the input buffers. In this embodiment of the invention the congestion manager avoids strict compliance with closed loop congestion management algorithm such as a 'leaky bucket' or 'token' or an open loop algorithm requiring an 'Ack' or 'Nack' preferring instead to preferentially retain the identified subset of packets and at the expense of remaining packets in the input buffer pool which are dropped to relieve congestion. This assures that the identified subset reaches the requesting host/client/subscriber as rapidly as possible by avoiding retransmission of same.

The scheduler module 436 expedites processing of an identified subset of packets of the newly selected video channel by placing same in the expedited video output queue 412 and scheduling delivery of same at a higher priority and frequency than remaining packets which are in the 'normal' video queue 414. In an embodiment of the invention the scheduler assigns the expedited video queue higher priority and frequency than all of the remaining queues including the voice, normal video and data queues 410, 414 and 416 respectively. In embodiments of the invention in which the distribution node includes delivery paths with different throughput speeds or latencies the scheduler may further expedite delivery of the identified subset of packets of the newly selected video channel by placing them on the fast path, as opposed to remaining packets of the video channel which may be placed on the relatively slower path. This also assures that the identified subset of packets reaches the requesting host/client/subscriber as expeditiously as possible in comparison to other non-identified packets associated with the remainder of the packets associated with the video channel.

Individually and collectively the expedited previewing, preferential retention, and expedited delivery afforded to the identified subset of packets of the newly selected video channel by the video sub-channel manager reduces the delay and therefore the latency associated with channel switchover through one or more of the distribution nodes, including in this embodiment a compliant router, switch or bridge. This improves the user experience by minimizing the delay associated with channel switchover.

FIG. 5 is a hardware block diagram of a representative broadband access device (BAD), which in the embodiment shown is the XDSL modem 144 of FIG. 1. The modem includes: a network interface 500 and a subscriber line interface 536 coupled to one another via transmit path components 520 and receive path components 540 for transmission and reception respectively of subscriber communications. The transmit path components include an input buffer pool 502 in which received packets are buffered before passing to transmit queues 506 which prioritize packet transmission based on criteria including terms of service and data type, e.g. voice video and data. The buffered packets are placed in a corresponding one of prioritized transmit queues, as determined by the terms of service (TOS) manager 508. The queues include: voice 510, video 514, and data 516 transmit queues for delivery via scheduling multiplexer 518 to the framer. In the framer 524 the bits from the transmit queues are framed onto either the fast path 528 or the interleaved path 526. The interleaved path includes a forward error correction (FEC) encoder and an interleaver for improving noise immunity of the transferred data at the expense of latency. In the encoder and mapper 530 the bits for each tone are converted to a complex number or sub-symbol which defines the phase and amplitude relationship with which to modulate each sub-channels carrier tone. Then after gain scaling all of the sub-symbols a.k.a. tones are converted from the frequency domain to the time domain in the Inverse Discrete Fourier Transform (IDFT) component 530. Next the transmitted communication channel is converted from digital to analog in the digital-to-analog converter (DAC) 534 which is part of the analog portion of the transmit path. The analog portion may also include an interpolator and digital or analog filters, in alternate embodiments of the invention.

The receive path 540 also includes analog and digital portions for reception of data. The receive path accepts modulated data from subscriber line via interface 536 and digitizes the received data in the analog-to-digital converter 542 which is part of the analog portion of the receive path. The analog portion may also include digital or analog filters and a decimator, in alternate embodiments of the invention. The digitized data is passed to the Discrete Fourier Transform (DFT) component 544 in which each tone/sub-channel in the time domain is converted to a corresponding tone a.k.a. sub-symbol in the frequency domain. Each sub-symbol may be represented mathematically as a complex number expressing the phase and amplitude relationship between the carrier tone and the pilot or message data modulated thereon. Collectively each set of sub-symbols/tones make up a symbol. Subsequently, each sub-symbol is decoded to a corresponding binary sequence in the decoder and demapper 546. The resultant bits of the fast and interleaved paths 550 and 548 are deframed in the deframer 552 with the interleaved path bits decoded by the FEC decoder 554. The resultant demodulated digital data stream is output from the de-framer to the network interface.

The core processor 560 is shown coupled to the transmit and receive path components as well as to the memory 562. Memory 562 stores setup data and initialization data 564, e.g. gain tables, equalization parameters, Power Spectral Density (PSD) parameters etc. determined during the initialization of a pair of modems across a given communication medium, e.g. subscriber line 142 (See FIG. 1) Additionally the memory includes detailed data cumulated during operation such as the signal-to-noise (SNR) ratio on each received tone.

The video sub-channel manager (VSM) 570 in this embodiment of the invention couples to the various modem components to reduce the latency associated with delivering a newly selected video channel and the packets associated therewith to a host/client/subscriber which has requested the channel.

The sub-channel identification module 572 of the VSM identifies a subset of the received packets associated with the new video channel for expedited processing. The changeover library manager module 574 stores prior identified subsets of packets from prior selected video channels and retrieves the one corresponding with a newly selected channel.

The changeover library manager then elevates the delivery priority of the subset located in storage by placing it in the expedited video output queue 512 as opposed to video queue 514 which has a relatively lower priority. This assures that the associated 'preview thumbnail' of the newly selected video channel will have the highest delivery priority to the requesting host/client/subscriber.

The congestion manager module 578 may also expedite processing of an identified subset of packets of a newly selected video channel by avoiding discard of such packets in the event of congestion in the input buffers and by dropping remaining packets in the input buffer pool to relieve congestion.

The scheduler module 576 may also expedite processing of an identified subset of packets of the newly selected video channel by placing same in the expedited video output queue 512 and scheduling delivery of same at a higher priority and frequency than remaining packets which are in the 'normal' video queue 514. In an embodiment of the invention the scheduler assigns the expedited video queue higher priority and frequency than all of the remaining queues including the voice, normal video and data queues 510, 514 and 516 respectively. The path selector 580 may further expedite delivery of the identified subset of packets of the newly selected video channel by placing them on the fast path 528, thereby avoiding the increased latency associated with the interleaved path including the encoding performed by the FEC encoder 524 and interleaving performed by interleaver 526 and their counterparts on the receive path of the opposing modem.

Individually and collectively the expedited previewing, preferential retention, and expedited delivery afforded to the identified subset of packets of the newly selected video channel by the video sub-channel manager reduces the delay and therefore the latency associated with channel switchover through one or more of the distribution nodes, including in this embodiment a compliant broadband access device. This improves the user experience by minimizing the delay associated with channel switchover.

In alternate embodiments the broadband access devices (BAD) having the claimed features may comprise: a cable modem, wireless access points, cell phones, an optical transceiver and a microwave transceiver.

FIG. 6 is a hardware block diagram of the set top box or gateway 182 of FIG. 1. The set top box in this embodiment of the invention includes transceivers for satellite 600, wireless 602, cable 604, and DSL based content delivery. The set top box also includes a hard disk drive 612 for storage of time shifted TV or video 614. Input/output controller 610 under control of both the remote control module 642 and the access control module 640 handles delivery of the received content to the input queues 616.

The terms of service (TOS) manager 618 controls placement of the received content into a corresponding one of the voice 510, video 514, and data 516 queues for delivery via scheduling multiplexer 628 to the video codec and display drivers. In the MPEG component 630 the received content is decoded and delivered to the display and graphic controller 632. Subsequent processing as may be required if the display device is analog is provided by the National Television System Committee (NTSC) or Phase Alternating Line (PAL) converter 634 and the audio and video DAC 636. The resultant output is delivered to the display device via the media interface 670.

The video sub-channel manager (VSM) 650 in this embodiment of the invention couples to the various components which drive the display to reduce the latency associated with delivering a newly selected video channel and the packets associated therewith to the display.

The sub-channel identification module 652 of the VSM identifies a subset of the received packets associated with the new video channel for expedited processing. The changeover library manager module 654 stores prior identified subsets of packets from prior selected video channels and retrieves the one corresponding with a newly selected channel.

The changeover library manager then elevates the delivery priority of the subset located in storage by placing it in the expedited video output queue 622 as opposed to video queue 624 which has a relatively lower priority. This assures that the associated 'preview thumbnail' of the newly selected video channel will have the highest delivery priority to the requesting host/client/subscriber.

The congestion manager module 658 may also expedite processing of an identified subset of packets of a newly selected video channel by avoiding discard of such packets in the event of congestion in the expedited video queue 622 and by dropping remaining packets in the video queue 624 to relieve congestion.

The scheduler module 656 may also expedite processing of an identified subset of packets of the newly selected video channel by placing same in the expedited video output queue 622 and scheduling delivery of same at a higher priority and frequency than remaining packets which are in the 'normal' video queue 624. In an embodiment of the invention the scheduler assigns the expedited video queue higher priority and frequency than all of the remaining queues including the voice, normal video and data queues 620, 624 and 626 respectively. In embodiments of the invention in which the distribution node includes delivery paths with different throughput speeds or latencies the scheduler may further expedite delivery of the identified subset of packets of the newly selected video channel by placing them on the fast path, as opposed to remaining packets of the video channel which may be placed on the relatively slower path.

Individually and collectively the expedited previewing, preferential retention, and expedited delivery afforded to the identified subset of packets of the newly selected video channel by the video sub-channel manager reduces the delay and therefore the latency associated with channel switchover through one or more of the distribution nodes, including in this embodiment a compliant set top box or residential gateway. This improves the user experience by minimizing the delay associated with channel switchover.

Figure 7:
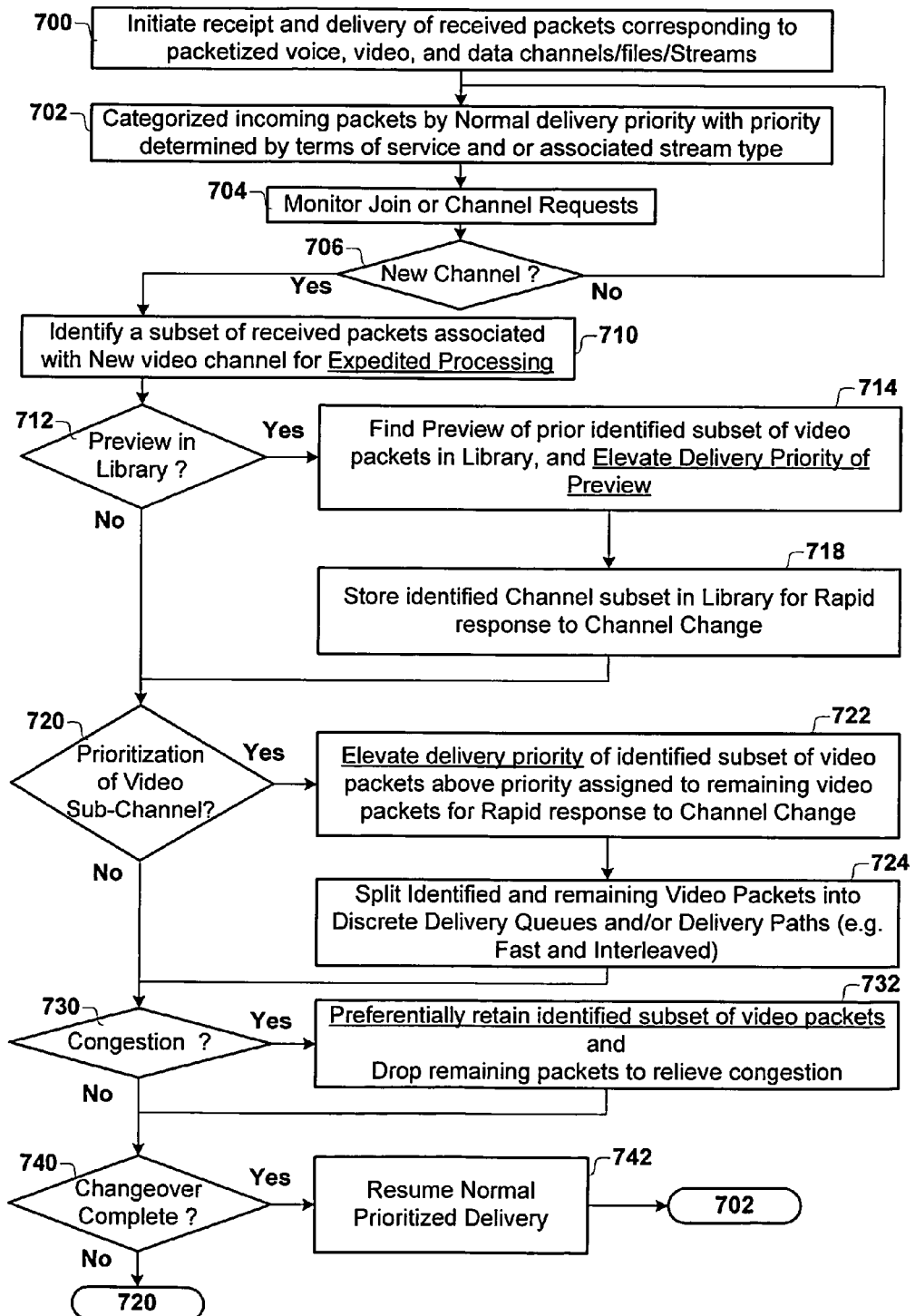
FIG. 7 is a process flow diagram of video or TV distribution processes performed on the distribution nodes shown in FIGS. 4, 5 and 6 in accordance with an embodiment of the invention.

FIG. 7 is a process flow diagram of video or TV distribution processes performed on the distribution nodes shown in FIGS. 4, 5 and 6 in accordance with an embodiment of the invention. In process 700 the distribution node initiates receipt and delivery of received packets corresponding to packetized voice video and data channels. This includes as indicated in process 702 the categorization of incoming packets in terms 'normal' delivery property as determined by terms of service and associated stream type, e.g. audio, video, data. Next in process 704 multicast IGMP and PIM requests, trees and tables are monitored to determine the existence of new video channels, e.g. via a group join request from a host.

In decision process 706 a determination is made as to whether a new video channel is requested. If not control returns to process 702 for the ongoing processing of existing packet switched traffic including previously selected video channels. When a new video channel is requested control is passed to process 710. In process 710 a subset of received packets within the new video channel is identified for expedited processing. In an embodiment of the invention the packets identified for expedited processing comprise the first few packets of a new video channel including both "I" frames as well as other frame types. The number of packets identified in this manner may be less than 100 corresponding to the first few seconds of the new video channel. In another embodiment of the invention the packets identified for expedited processing comprise exclusively "I" frames from the first few packets of the new video channel.

In decision process 712 a determination is made as to whether a library of channel is available. If it is then in process 714 the library is searched for previews corresponding with the newly selected video channel and if found such preview is placed in the expedited video queue for expedited delivery to the requesting host/client/subscriber. In the following step 718 the subset of received packets identified in process 710 is stored in the library thereby adding or updating to the available previews therein.

Next in decision process 720 a determination is made as to whether delivery prioritization among competing delivery queues is supported. If delivery prioritization is supported control passes to process 722. In process 722 the delivery priority of the subset of video packets identified in process 710 is elevated at least above the priority assigned to remaining video packets, thereby decreasing the latency associated with responding to the newly selected channel. Next in process 724 the video queue is temporarily split into discrete delivery queues and/or paths with the identified subset placed in the expedited queue and the remaining video packets in the normal and relatively lower priority video queue.

Next in decision process 730 a determination is made as to whether congestion management is enabled and required. If it is control passes to process 732. In process 732 the identified subset of video packets of step 710 is preferentially retained and remaining video packets are dropped to relieve congestion as required.

When the changeover of queues and buffers associated with delivery of the new channel is complete as determined in decision process 740, control is passed to process 742. In process 742 normal priorities and congestion management of video packets is resumed after which control returns to process 702. Until changeover is complete control returns to decision process 720.

The components and processes disclosed herein may be implemented as software, hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A distribution node among a network of distribution nodes for packet based distribution of voice, video and data packets including multicast packet based distribution of video channels from at least one video server distribution node to a plurality of client distribution nodes selectively consuming the video channels; and the distribution node among the network of distribution nodes comprising:
   an input buffer for storing packets of video content associated with the video channels, the video content comprising a plurality of successive frames, wherein each of the frames is encoded with a single one of a plurality of different frame compression types; and
   a video sub-channel manager responsive to selection of a new video channel to identify a sub-set of packets within a set of packets of the new video channel within the input buffer for expedited delivery and to expedite delivery of the identified sub-set of packets from the input buffer, wherein the identified sub-set of packets include those belonging to a frame encoded with a particular one of the plurality of different frame compression types, and wherein remaining packets of the new video channel within the input buffer other than the identified sub-set of packets are allowed to remain in the input buffer until after the expedited delivery of the identified sub-set of packets; thereby reducing switchover latency of the distribution node in response to a selection of the new video channel.

2. The distribution node of claim 1, wherein the video sub-channel manager further comprises:
   a scheduler responsive to the selection of the new video channel to temporarily split the video packets into a first delivery queue for the identified sub-set of packets and a second delivery queue for remaining packets of the video channel and the scheduler further configured to temporarily assign an elevated delivery priority to packets in the first video queue relative to packets in the second video queue.

3. The distribution node of claim 1, having VDSL distribution capability, and wherein the video sub-channel manager further comprises:
   a scheduler which temporarily splits video packet delivery queues into a first queue for identified sub-set of packets and a second queue for remaining packets of the video channel and which further temporarily assigns packets in the first video queue to a VDSL fast path and packets in the second video queue to a VDSL interleaved path; thereby reducing switchover latency of the distribution node in response to a selection of the video channel.

4. The distribution node of claim 1, wherein the video sub-channel manager further comprises:
   a congestion manager which temporarily manages congestion among incoming packets by preferentially retaining identified subset of video packets and dropping remaining video packets as required to relieve congestion; thereby expediting delivery of identified video packets in response to a selection of the video channel.

5. The distribution node of claim 1, wherein the video sub-channel manager further comprises:
   a changeover library manager for storing identified sub-sets of packets for previously selected video channels and for retrieving a stored sub-set corresponding with the new video channel and elevating a delivery priority for the stored sub-set in response to a selection of the new video channel.

6. The distribution node of claim 1, wherein the video channel comprises an Motion Picture Experts Group (MPEG) encoded video channel and wherein the identified sub-set of packets of the video channel comprise packets transporting "I" frames.

7. The distribution node of claim 1, configured as at least one of: a video head end, a router, a switch, a bridge, a gateway, a broadband access device, a residential gateway, and a set top box.

8. The distribution node of claim 1, wherein the video channels comprise at least one of: a TV channel, an Internet Protocol TV channel, and a Video on Demand (VOD).

9. A method for packet based distribution of voice, video and data packets including multicast packet based distribution of video channels from at least one video server distribution node to a plurality of client distribution nodes selectively consuming the video channels; and the method for distribution node comprising:
   buffering packets of video content associated with the video channels in an input buffer, the video content comprising a plurality of successive frames, wherein each of the frames is encoded with a single one of a plurality of different frame compression types;
   identifying within the input buffer a sub-set of packets within a set of packets of a video channel for expedited delivery, wherein the identified sub-set of packets include those belonging to a frame encoded with a particular one of the plurality of different frame compression types; and
   expediting delivery of the identified sub-set of packets from the input buffer responsive to a selection of the video channel; thereby reducing switchover latency of the distribution node in response to a selection of the video channel, wherein remaining packets of the new video channel within the input buffer other than the identified sub-set of packets are allowed to remain in the input buffer until after the expedited deliver of the identified sub-set of packets.

10. The method for distribution of claim 9, further comprising:
    temporarily splitting the video channel into a first delivery queue for the identified sub-set of packets and a second delivery queue for remaining packets of the video channel; and
    temporarily assigning an elevated delivery priority to packets in the first video queue relative to packets in the second video queue; responsive to the selection of the new video channel.

11. The method for distribution of claim 9, further comprising:
    providing VDSL distribution capability including a fast path and an interleaved path;
    temporarily splitting the video channel into a first delivery queue for the identified sub-set of packets and a second delivery queue for remaining packets of the video channel; and
    temporarily assigning packets in the first video queue to a VDSL fast path and packets in the second video queue to a VDSL interleaved path; thereby reducing switchover latency of the distribution node.

12. The method for distribution of claim 9, further comprising:
    temporarily managing congestion among incoming packets by preferentially retaining the identified subset of video packets and dropping remaining video packets as required to relieve congestion; thereby expediting delivery of identified video packets in response to a selection of the video channel.

13. The method for distribution of claim 9, further comprising:
    storing identified sub-sets of packets for previously selected video channels;
    retrieving a stored sub-set corresponding with the new video channel; and
    elevating a delivery priority for the stored sub-set in response to a selection of the new video channel.

14. The method for distribution of claim 9, wherein the video channel comprises an Motion Picture Experts Group (MPEG) encoded video channel and wherein the identified sub-set of packets of the video channel comprise packets transporting "I" frames.

15. The method for distribution of claim 9, wherein the video channels comprise at least one of: a TV channel, an Internet Protocol TV channel, and a Video on Demand (VOD).

16. A means for packet based distribution of voice, video and data packets including multicast packet based distribution of video channels from at least one video server distribution node to a plurality of client distribution nodes selectively consuming the video channels; and the means for packet based distribution comprising:
    means for buffering packets of video content associated with the video channels in an input buffer, the video content comprising a plurality of successive frames, wherein each of the frames is encoded with a single one of a plurality of different frame compression types;
    means for identifying within the input buffer a sub-set of packets within a set of packets of a video channel for expedited delivery, wherein the identified sub-set of packets include those belonging to a frame encoded with a particular one of the plurality of different frame compression types; and means for expediting delivery of the identified sub-set of packets from the input buffer responsive to a selection of the video channel; thereby reducing switchover latency of the distribution node in response to a selection of the video channel, wherein remaining packets of the new video channel within the input buffer other than the identified sub-set of packets are allowed to remain in the input buffer until after the expedited delivery of the identified sub-set of packets.

17. The means for packet based distribution of claim 16, further comprising:
means for temporarily splitting the video channel into a first delivery queue for the identified sub-set of packets and a second delivery queue for remaining packets of the video channel; and
means for temporarily assigning an elevated delivery priority to packets in the first video queue relative to packets in the second video queue; responsive to the selection of the new video channel.

18. The means for packet based distribution of claim 16, further comprising:
means for providing VDSL distribution capability including a fast path and an interleaved path;
means for temporarily splitting the video channel into a first delivery queue for the identified sub-set of packets and a second delivery queue for remaining packets of the video channel; and
means for temporarily assigning packets in the first video queue to a VDSL fast path and packets in the second video queue to a VDSL interleaved path; thereby reducing switchover latency of the distribution node.

19. The means for packet based distribution of claim 16, further comprising:
means for temporarily managing congestion among incoming packets by preferentially retaining the identified subset of video packets and dropping remaining video packets as required to relieve congestion; thereby expediting delivery of identified video packets in response to a selection of the video channel.

20. The means for packet based distribution of claim 16, further comprising:
means for storing identified sub-sets of packets for previously selected video channels;
means for retrieving a stored sub-set corresponding with the new video channel; and
means for elevating a delivery priority for the stored sub-set in response to a selection of the new video channel.

21. The means for packet based distribution of claim 16, wherein the video channel comprises an Motion Picture Experts Group (MPEG) encoded video channel and wherein the identified sub-set of packets of the video channel comprise packets transporting "I" frames.

22. The means for packet based distribution of claim 16, wherein the video channels comprise at least one of: a TV channel, an Internet Protocol TV channel, and a Video on Demand (VOD).

\* \* \* \* \*

UNITED STATES PATENT AND TRADEMARK OFFICE
CERTIFICATE OF CORRECTION

Page 1 of 1

PATENT NO.         : 8,797,872 B1
APPLICATION NO.    : 12/924764
DATED              : August 5, 2014
INVENTOR(S)        : Lambi It is certified that error appears in the above-identified patent and that said Letters Patent is hereby corrected as shown below:

In the Claims

In Column 12, Line 2, in Claim 9, delete "deliver" and insert -- delivery --, therefor.

Signed and Sealed this
Twenty-first Day of April, 2015

Michelle K. Lee
*Director of the United States Patent and Trademark Office*